(12) United States Patent
Wood

(10) Patent No.: US 9,379,912 B2
(45) Date of Patent: Jun. 28, 2016

(54) MITIGATING EMAIL SPAM ATTACKS

(75) Inventor: Stephen Wood, Whitehouse St., NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 999 days.

(21) Appl. No.: 12/962,699

(22) Filed: Dec. 8, 2010

(65) Prior Publication Data
US 2012/0150965 A1 Jun. 14, 2012

(51) Int. Cl.
*G06F 15/16* (2006.01)
*G06F 15/177* (2006.01)
*H04L 12/58* (2006.01)

(52) U.S. Cl.
CPC .............. *H04L 12/585* (2013.01); *H04L 51/12* (2013.01)

(58) Field of Classification Search
None
See application file for complete search history.

(56) References Cited

U.S. PATENT DOCUMENTS

| 7,194,484 | B2 * | 3/2007 | Aoki |
| 8,230,020 | B2 * | 7/2012 | Vill ............................... 709/206 |
| 2003/0135565 | A1 * | 7/2003 | Estrada ......................... 709/206 |
| 2004/0199592 | A1 * | 10/2004 | Gould et al. .................. 709/206 |
| 2005/0015626 | A1 * | 1/2005 | Chasin .......................... 713/201 |
| 2006/0031359 | A1 * | 2/2006 | Clegg et al. .................. 709/206 |
| 2006/0168059 | A1 * | 7/2006 | Chang et al. ................. 709/206 |
| 2009/0064330 | A1 * | 3/2009 | Shraim et al. .................. 726/22 |
| 2013/0242743 | A1 * | 9/2013 | Thomas et al. ............... 370/236 |

* cited by examiner

*Primary Examiner* — Djenane Bayard
*Assistant Examiner* — Farrukh Hussain
(74) *Attorney, Agent, or Firm* — Hartman & Citrin LLC

(57) ABSTRACT

The present disclosure relates to mitigating email spam attacks. A gateway is configured to receive mail from one or more mail systems. If mail is intended for delivery to an invalid address, the gateway can generate status messages for delivery to the mail systems or determine if a threshold for delivery attempts to the invalid address has been met. If the threshold has been met, the gateway can request creation of a honeypot email address, and future mail intended for delivery to the invalid address are delivered to a mailbox associated with the honeypot email address. Various actions can be taken with respect to the mail delivered to the honeypot email address including analysis, blacklisting of senders, and/or other actions.

16 Claims, 5 Drawing Sheets

MITIGATING EMAIL SPAM ATTACKS

BACKGROUND

This application relates generally to email services. More particularly, the disclosure provided herein relates to systems and methods for mitigating email spam attacks.

Unsolicited bulk email ("UBE," hereinafter referred to as "spam") is generally defined as unwanted and/or unsolicited e-mail. Each day, email user accounts controlled by spammers connect or attempt to connect to Internet Service Providers ("ISPs") to transmit spam. These email user accounts may reside on the same ISP domain to which the spammers connect, or they may reside on other ISPs, corporate mail systems, hosting services, and/or network client mail systems.

It is common for large ISPs to receive hundreds of millions of spam messages each day. The spam messages may be transmitted from millions of email user accounts, some of which may have never before connected to the ISP. Over the last several years, a growing portion of the spam that is sent by spammers is passing through the ISPs' defenses and being delivered into users' mailboxes. At the same time, a growing portion of spam originates from legitimate user accounts associated with ISPs.

Spammers are continuously compromising user PCs and/or email accounts, or creating new email accounts on ISPs. From these accounts the spammers send large volumes of spam messages through the ISP to attack other ISPs. Spammers assume that destination ISPs will not block the traffic from other well-known ISPs. For example, the spammers assume that the destination ISP will not put the ISP's IP address on a blacklist because legitimate users of the ISP would also be blocked as a result. Additionally, spammers send spam from their ISP email accounts to other user accounts on the same ISP. Spammers know that ISPs will not block the ISP's dynamic IP addresses because of the support costs that would result when the blocked dynamic IP addresses are assigned to other users. As a result, ISPs' defense against spam coming from these sources may be limited to spam content filtering.

As a result of being unsure of the sender's identity, lack of reputation, the ever increasing difficulty with ascertaining whether a message is spam, the increasing effectiveness of spammers, the reluctance of ISPs to block other ISPs or client IP addresses associated with the ISPs, and/or other factors, ISPs have an increasingly difficult time improving the effectiveness of current spam blocking and filtering processes. As such, spam is increasingly delivered to ISP members' mailboxes and continues to adversely affected members' experiences using email. In addition, spamming continues to increase ISPs' costs for providing email services.

SUMMARY

The present disclosure is directed to systems and methods for mitigating email spam attacks. A gateway is configured to receive mail from one or more mail systems. If mail is intended for delivery to an invalid address, the gateway can generate status messages for delivery to the mail systems or determine if a threshold for delivery attempts to the invalid address has been met. If the threshold has been met, the gateway can request creation of a honeypot email address, and future mail intended for delivery to the invalid address is delivered to a mailbox associated with the honeypot email address. Various actions can be taken with respect to the mail delivered to the honeypot email address including analysis, blacklisting of senders, and/or other actions. According to some exemplary embodiments, the concepts and technologies disclosed herein are used to create a large number of honeypot email addresses such that legitimate email addresses are obfuscated, thereby mitigating the impact of spam attacks.

According to one aspect, a computer-implemented method for managing a honeypot email address includes computer-implemented operations for receiving, at a gateway, mail intended for delivery to an address. The gateway is configured to determine if the address includes a valid address or an invalid address. If the address includes the invalid address, the method further includes determining if a delivery attempt threshold is met. If the delivery attempt threshold is met, the method further includes requesting creation of the honeypot email address. In some embodiments, the method also includes updating a configuration file with data indicating an attempted delivery of the mail to the address, in response to determining that the delivery attempt threshold is not met. Data identifying the honeypot email address can be stored at a data storage location accessible by the gateway. The honeypot email address includes the address.

In some embodiments, the method further includes receiving another mail, the other mail intended for delivery to the address, analyzing the other mail to determine content of the other mail, and determining if the other mail includes a spam message based upon the content determined. If the other mail includes the spam message, the method includes taking an action. According to some embodiments, the action includes delivering the other mail to a mailbox associated with the honeypot email address. In other embodiments, the action includes delivering the other mail to a mailbox associated with the honeypot email address, identifying a sender associated with the other mail, and updating a spam filter to include data identifying the sender. In yet other embodiments, the action includes delivering the other mail to a mailbox associated with the honeypot email address, analyzing the content of the other mail, and updating a spam filter to include data corresponding to the content analyzed.

According to some embodiments, the delivery attempt threshold includes a number of delivery attempts within a defined period of time. The gateway functions, in some implementations, as an SMTP gateway associated with an Internet Service Provider. The honeypot email address may include a domain name associated with the Internet Service Provider, and an email address of a sender associated with the other mail may include the domain name.

According to another aspect, a computer storage medium has computer executable instructions stored thereupon. When executed by a computer, the instructions cause the computer to receive, at a gateway, mail intended for delivery to an email address and determine if the email address includes a valid email address or an invalid email address. If the email address includes the invalid email address, the instructions cause the computer to determine if a delivery attempt threshold is met, the delivery attempt threshold including a number of attempted deliveries. If the delivery attempt threshold is met, the instructions cause the computer to request creation of the honeypot email address, the honeypot email address including the address, and store data identifying the honeypot email address at a data storage location accessible by the gateway.

In some embodiments, the computer storage medium further includes instructions that, when executed by the computer, cause the computer to update a configuration file stored at the data storage location with data indicating an attempted delivery of the mail to the address, in response to determining that the delivery attempt threshold is not met. The computer storage medium also can include instructions that, when executed by the computer, cause the computer to recognize that another mail intended for delivery to the address has been received, analyze the other mail to identify content of the other mail, and determine if the other mail includes a spam message based upon the content identified. The computer storage medium further includes instructions that, when executed by the computer, cause the computer to take an action, in response to determining that the other mail includes the spam message. The action includes, in some embodiments, delivering the other mail to a mailbox associated with the honeypot email address.

According to another aspect, a computer-implemented method for dynamically allocating resources is disclosed. The method includes computer-implemented operations for receiving, at a gateway, mail intended for delivery to an email address and determining if the email address includes a valid email address or an invalid email address. If the email address includes the invalid email address, the method includes determining if a delivery attempt threshold is met, the delivery attempt threshold including a number of attempted deliveries. If the delivery attempt threshold is met, the method further includes requesting creation of the honeypot email address, the honeypot email address including the address, and storing data identifying the honeypot email address at a data storage location accessible by the gateway. If the delivery attempt threshold is not met, the method includes updating a configuration file stored at the data storage location with data indicating an attempted delivery of the mail to the address.

In some embodiments, the method also includes receiving another mail intended for delivery to the email address. The other mail is analyzed to identify content of the other mail. The method includes determining if the other mail includes a spam message based upon the content identified. If the other mail includes the spam message, the method includes delivering the other mail to a mailbox associated with the honeypot email address.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure, and be protected by the accompanying claims.

DETAILED DESCRIPTION

The following detailed description is directed to methods, systems, and computer-readable media for mitigating email spam attacks. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
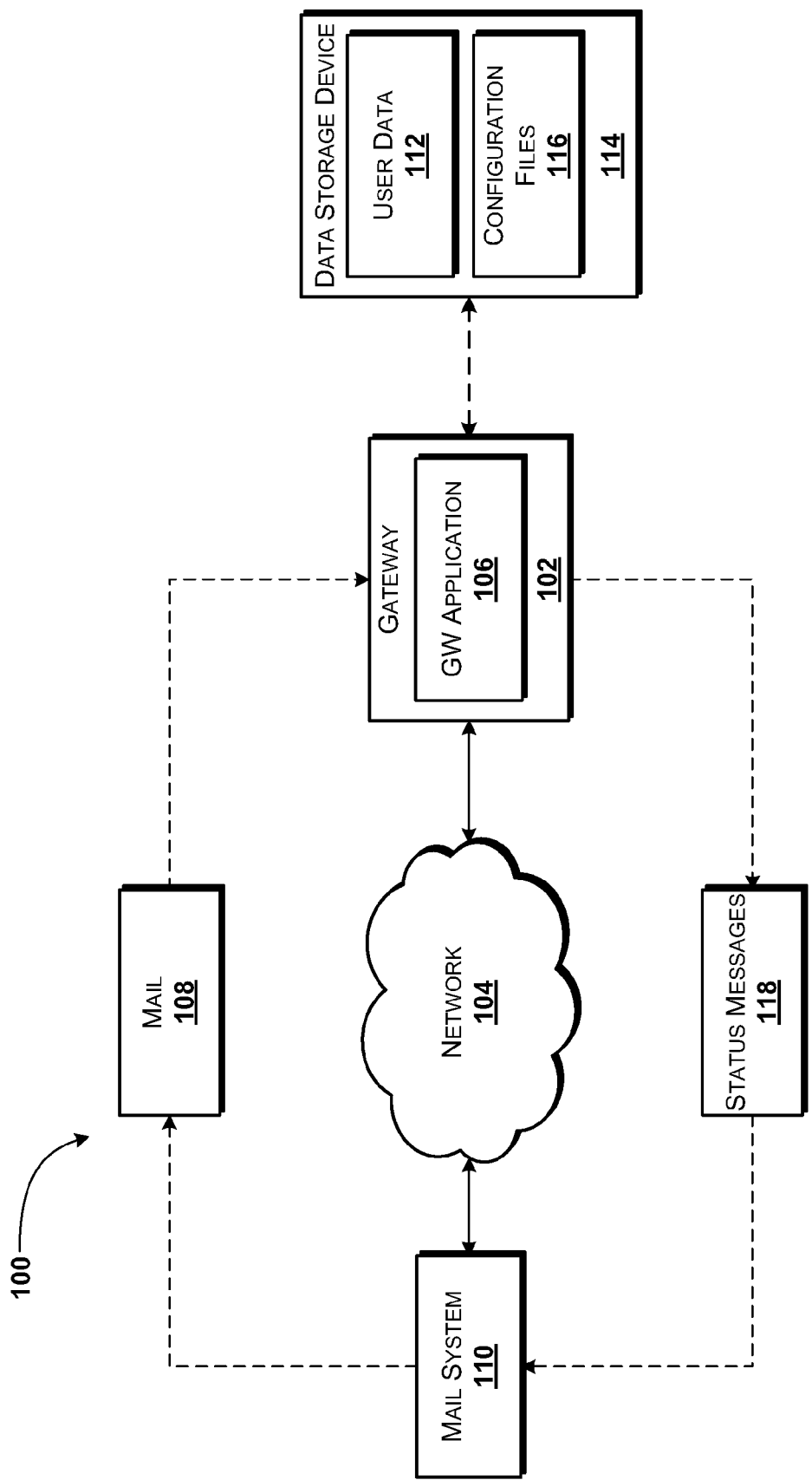
FIG. 1 is a system diagram schematically illustrating an exemplary operating environment for various embodiments disclosed herein.

Referring now to FIG. 1, aspects of an exemplary system 100 for mitigating email spam attacks are described, according to an exemplary embodiment. The system 100 includes a gateway 102 operating on or in communication with a communications network 104 ("network"). According to various embodiments, the network 104 includes one or more communications networks including, but not limited to, cellular networks, packet data networks, and/or public switched telephone networks. These and other aspects of an exemplary embodiment of the network 104 are described below with reference to FIG. 4.

The gateway 102 provides functionality associated with an SMTP inbound or outbound gateway for a mail service, an ISP, or for other entities or types of entities. For purposes of describing the concepts and technologies disclosed herein in detail, the gateway 102 is described herein as an SMTP inbound gateway for an ISP. It should be understood that this embodiment is exemplary, and should not be construed as being limiting in any way.

The gateway 102 is configured to execute an operating system (not illustrated) and one or more application programs including, but not limited to, a gateway application 106. The operating system is a computer program for controlling the operation of the gateway 102. Examples of operating systems include, but are not limited to, the WINDOWS family of operating systems from MICROSOFT CORPORATION, LINUX, SYMBIAN from SYMBIAN LIMITED, BREW from QUALCOMM CORPORATION, MAC OS from APPLE CORPORATION, and FREEBSD.

The gateway application 106 is an executable program configured to execute on top of the operating system to provide the functionality described herein for mitigating spam attacks. While the gateway 102 is described herein as executing the gateway application 106, it should be understood that this embodiment is exemplary. More particularly, in some embodiments, the gateway application 106 is embodied in a hardware device separate from the gateway 102.

The gateway application 106 is configured to analyze received email messages 108 (hereinafter referred to as "mail 108") delivered to the gateway 102 by a mail system 110. The gateway application 106 analyzes the mail 108 to identify one or more destination addresses associated with the mail 108. According to various implementations, destination addresses of the mail 108 can include valid email addresses and/or invalid email addresses.

According to various implementations, the gateway application 106 accesses user data 112. The user data 112 can include a list of email addresses for the ISP. In some embodiments, the user data 112 includes valid email addresses, expired email addresses, and/or invalid email addresses. In some embodiments, the user data 112 is stored at or proximate to the gateway 102 in memory, database, or other data storage location. In other embodiments, the user data 112 is stored in a data storage device 114 that is accessible to the gateway 102 via a direct communications link or via one or more network connections. In the illustrated embodiment, the functionality of the data storage device 114 is provided by a database that stores the user data 112 and configuration files 116. It should be understood that this embodiment is exemplary, and should not be construed as being limiting in any way.

The gateway application 106 is configured to generate queries on the user data 112 to determine if identified email addresses for mail 108 are valid or invalid. The query results can identify one or more email addresses as valid or invalid. It should be understood that other methods for performing lookups of email addresses are possible, and are not limited to the embodiments described herein. For example, the gateway application 106 can directly perform a search of the user data 112, if desired, without generating and/or submitting queries to the data storage device 114 and/or other entities. Thus, it should be understood that the above embodiment is exemplary, and should not be construed as being limiting in any way.

The gateway application 106 is further configured to take various actions with respect to the mail 108. If the gateway application 106 determines that one or more email addresses to which the mail 108 is addressed are valid, the gateway application 106 can process the mail 108 and deliver the mail 108 to an appropriate mail storage location (not illustrated) associated with the intended recipients' email addresses. If the gateway application 106 determines that one or more email addresses to which the mail 108 is addressed are invalid, the gateway application 106 can provide the functionality described herein for mitigating spam email attacks.

According to various embodiments, the gateway application 106 is configured to access and/or maintain the configuration files 116 stored at the data storage device 114. The configuration files 116 can include, but are not limited to, data relating to suspected or known spam attacks. More particularly, according to some embodiments, the gateway application 106 can be configured to provide customary functionality for checking email addresses and returning status messages 118 to the mail system 110 when invalid email addresses are identified. The status messages 118 can be used to provide senders of email messages with information relating to the mail 108. For example, the status messages 118 can inform a sender of the mail 108 that the mail 108 is addressed to an invalid address.

Additionally, the gateway application 106 can store data in the configuration files 116, wherein the data stored by the gateway application 106 identifies the invalid email addresses and numbers of attempts to deliver email to the invalid email addresses. Upon determining that an email address to which the mail 108 is addressed is invalid, the gateway application 106 is configured to determine a number of mail delivery attempts to the invalid email address that have been made during a defined period of time. The defined period of time can be set by an administrator or other authorized entity associated with the gateway 102, and can range from an order of seconds, minutes, days, weeks, or years, or can be defined as an unlimited duration of time.

According to embodiments, a threshold is defined for delivery attempts to invalid email addresses within a defined period of time. According to one implementation, the threshold is five attempts per one hour period of time. It should be understood that this embodiment is exemplary, and should not be construed as being limiting in any way. If the gateway application 106 determines that the threshold has not been met, the gateway application 106 can increment the data stored as the configuration files to reflect the latest delivery attempt, and generate one or more status messages 118 for delivery to the mail system 110.

According to embodiments, if the gateway application 106 determines that the threshold has been met, the gateway application 106 is configured to suspect that the invalid email address is the target of a spam attack. The gateway application 106 is configured to take a number of actions to mitigate email spam attacks. In some embodiments, the gateway application 106 can be configured to create or request creation of a honeypot email address (hereinafter referred to as a "honeypot email ID"). For purposes of the specification and claims, a "honeypot email ID" or "honeypot email address" is an email address that is created based upon an attempted delivery of email to an invalid email address. The honeypot email ID may or may not be used for various purposes, as explained in detail herein. The honeypot email ID can be created by the gateway application 106 or another device or node in a manner similar to that used to create regular valid email accounts for users. Data indicating the honeypot email ID as a valid account and/or as a honeypot email ID can be stored with the user data 112.

It should be appreciated that in some embodiments, spam originates from a valid email address of an ISP, and that the targeted recipients of the spam may be associated with the same ISP. Thus, it should be understood that in some embodiments, a sender of a spam message may have an email address with the same domain name as a honeypot email ID. As such, the use of a honeypot email ID can simplify the task of blocking spam messages sent from email accounts associated with the same ISP as the honeypot email ID.

When mail 108 is received for the honeypot email ID, the gateway application 106 performs the lookup of the user data 112, as described above. Because the honeypot email ID is recognized by the gateway 102 as a valid email address, the mail 108 is delivered to the honeypot email ID. As such, in some embodiments the status messages 118 reporting errors with delivery are not generated or are suppressed by the gateway application 106. Thus, a sender associated with the mail 108 may not realize that spam messages sent to the honeypot email ID has not been delivered to an actual active email address associated with a recipient. Thus, instead of adjusting the recipient list for spam messages, a sender of the spam may believe that the spam has been successfully delivered.

The gateway application 106 is also configured to monitor the honeypot email IDs to identify spam messages, senders of spam messages, and the like. As will be described in more detail herein with reference to FIG. 3, the gateway application 106 can analyze messages for the honeypot email IDs, determine if the messages are spam, and take additional actions based upon this determination. For example, the gateway application 106 can be configured to improve spam filters by adding senders associated with the messages to the honeypot email IDs to blocklists. Additionally, or alternatively, the gateway application 106 can inform the mail system 110 that a sender is generating spam messages, if desired. Other actions can be taken by the gateway application 106, as will be described in more detail herein. In other embodiments, the gateway application 106 can be configured to deliver the mail 108 to the honeypot email IDs without taking other action, effectively letting the honeypot email IDs function as message quarantines, though messages associated with the honeypot email IDs can be analyzed to improve filtering and/or blocking rules, if desired.

Additionally, in some embodiments mailboxes associated with the honeypot email IDs are scanned periodically and/or regularly to count a number of messages deposited in the mailbox associated with the honeypot email IDs, as well as a number of messages deposited in a spam folder or other similar location. An estimate of the spam filtration rate for an ISP or other entity associated with the honeypot email IDs can be calculated based upon these two numbers. For example, the number of messages in the spam folder or other suitable location can be divided by the total number of messages in the Inbox and spam folders, thus allowing an objective measure of how well these and/or other spam mitigation techniques are performing. Values associated with these and/or other measures can be tracked over time to track performance over time. Additionally, the above method for tracking spam filtration allows for measuring effectiveness of other ISPs' spam filtration defenses, another metric that can be tracked over time to allow competitive comparison between ISPs and/or other entities. It should be understood that this embodiment is exemplary, and should not be construed as being limiting in any way.

FIG. 1 illustrates one gateway 102, one mail system 110, and one data storage device 114. It should be understood, however, that some implementations of the operating environment 100 include multiple gateways 102, mail systems 110, and multiple data storage devices 114. Therefore, the illustrated embodiment should be understood as being exemplary, and should not be construed as being limiting in any way.

Figure 2:
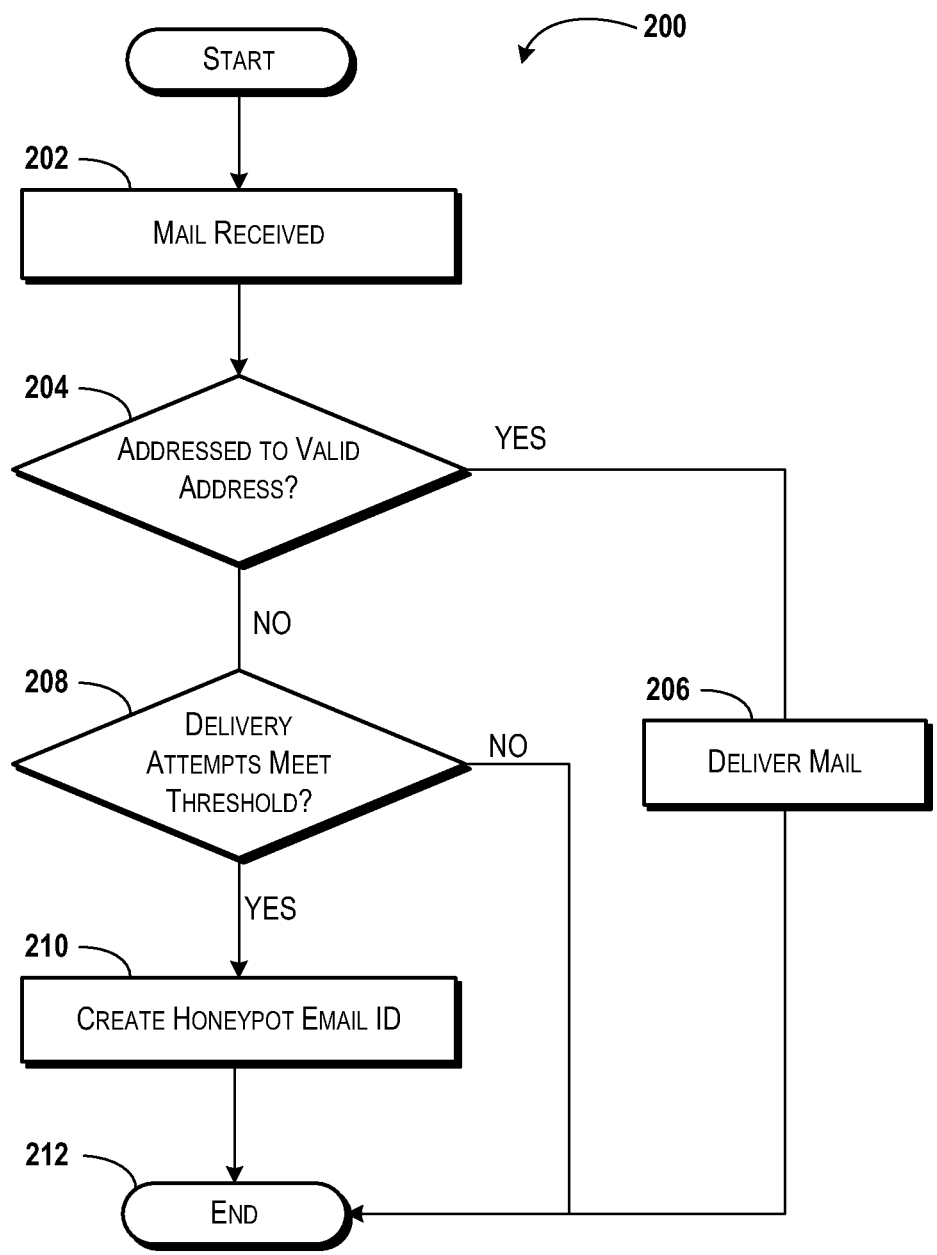
FIG. 2 is a flow diagram showing aspects of a method for creating a honeypot email ID, according to an exemplary embodiment.

Turning now to FIG. 2, aspects of a method 200 for creating a honeypot email ID will be described in detail, according to an exemplary embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the methods disclosed herein can be ended at any time and need not be performed in its entirety. Some or all operations of the methods, and/or substantially equivalent operations, can be performed by execution of computer-readable instructions included on a computer-storage media, as defined above. The term "computer-readable instructions," and variants thereof, as used in the description and claims, is used expansively hereinto include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the gateway 102. It should be understood that the gateway 102, as well as additional and/or alternative devices and/or network nodes, can provide the functionality described herein via execution of one or more application programs including, but not limited to, the gateway application 106. Furthermore, it should be understood that the functionality of the gateway 102 can be provided by any number of devices or network nodes, and is not limited to the gateway 102 illustrated in the FIGURES. Thus, the illustrated embodiment is exemplary, and should not be viewed as being limiting in any way.

The method 200 begins at operation 202, wherein mail 108 is received at the gateway 102. The mail 108 can be received from the mail system 110 via one or more networks and/or network connections. As will be explained in more detail with reference to FIG. 4, the network 104 can include a combination of one or more wireless and/or wireline networks. As such, it will be appreciated that the mail 108 can be sent from wireline and/or wireless devices, and can be transmitted to the gateway 102 via any number of wireline and/or wireless connections during delivery to the gateway 102.

From operation 202, the method 200 proceeds to operation 204, wherein the gateway 102 determines if an address to which the email is addressed is a valid address or an invalid address. According to various embodiments, the gateway 102 analyzes the mail 108 to identify recipients associated with the mail 108. As is known, the recipients of the mail 108 can be defined in a send-to header of the mail 108, CC or BCC headers of the mail 108, and/or elsewhere in the mail 108. Furthermore, headers of the mail 108 can define a number of addresses. For the sake of clarity, the method 200 is described with respect to a single address. It should be understood that the method 200, or additional and/or alternative methods, can be performed for each address defined in the mail 108. Thus, it will be understood that the embodiment described herein, where only one address is defined in the mail 108, is exemplary, and should not be construed as being limiting in any way.

If the gateway 102 determines, in operation 204, that an address to which the mail 108 is addressed is valid, the method 200 proceeds to operation 206, wherein the gateway 102 delivers the mail 108 to a mailbox associated with the address. Delivery of mail 108 to a mailbox is generally known, and will not be described in detail herein.

If the gateway 102 determines, in operation 204, that an address to which the mail 108 is addressed is not valid, the method 200 proceeds to operation 208, wherein the gateway 102 determines if delivery attempts associated with the invalid address have met a defined threshold. A threshold for delivery attempts can be defined as a number of delivery attempts and/or a number of delivery attempts within a defined time period. Thus, for example, a threshold may be set to one, wherein any delivery attempt to the invalid address is considered to meet the defined threshold. In other embodiments, the threshold is defined as a number of delivery attempts within a defined time period.

In one embodiment, for example, the threshold is defined as five delivery attempts within a one hour time period. Thus, a delivery attempt to an invalid address is considered to meet the threshold if five delivery attempts have been made to the same invalid address within a one hour time period. It should be understood that this embodiment is exemplary, and should not be construed as being limiting in any way. Regardless of how the threshold is defined, the gateway 102 determines in operation 208 if the threshold is met or exceeded.

If the gateway 102 determines, in operation 208, that the threshold has been met or exceeded, the method 200 proceeds to operation 210, wherein the gateway 102 creates a honeypot email ID or generates a request to create the honeypot email ID. More particularly, applications or devices other than the gateway 102 may be responsible for creating email accounts for an entity associated with the gateway 102. Thus, operation 210 can include the gateway 102 generating a request for the honeypot email ID and submitting the request to the appropriate entity. The request for the honeypot email ID can include information identifying the honeypot email ID requested. In the illustrated embodiment, the honeypot email ID request includes data identifying the addressee associated with the mail 108, and the honeypot email ID is created based upon that addressee. It should be understood that this embodiment is exemplary, and should not be construed as being limiting in any way.

If the gateway 102 determines, in operation 208, that the delivery attempt threshold has not been met or exceeded, the method 200 proceeds to operation 212. Additionally, from operation 210, the method 200 proceeds to operation 212. Also, from operation 206, the method 200 proceeds to operation 212. The method 200 ends at operation 212.

Figure 3:
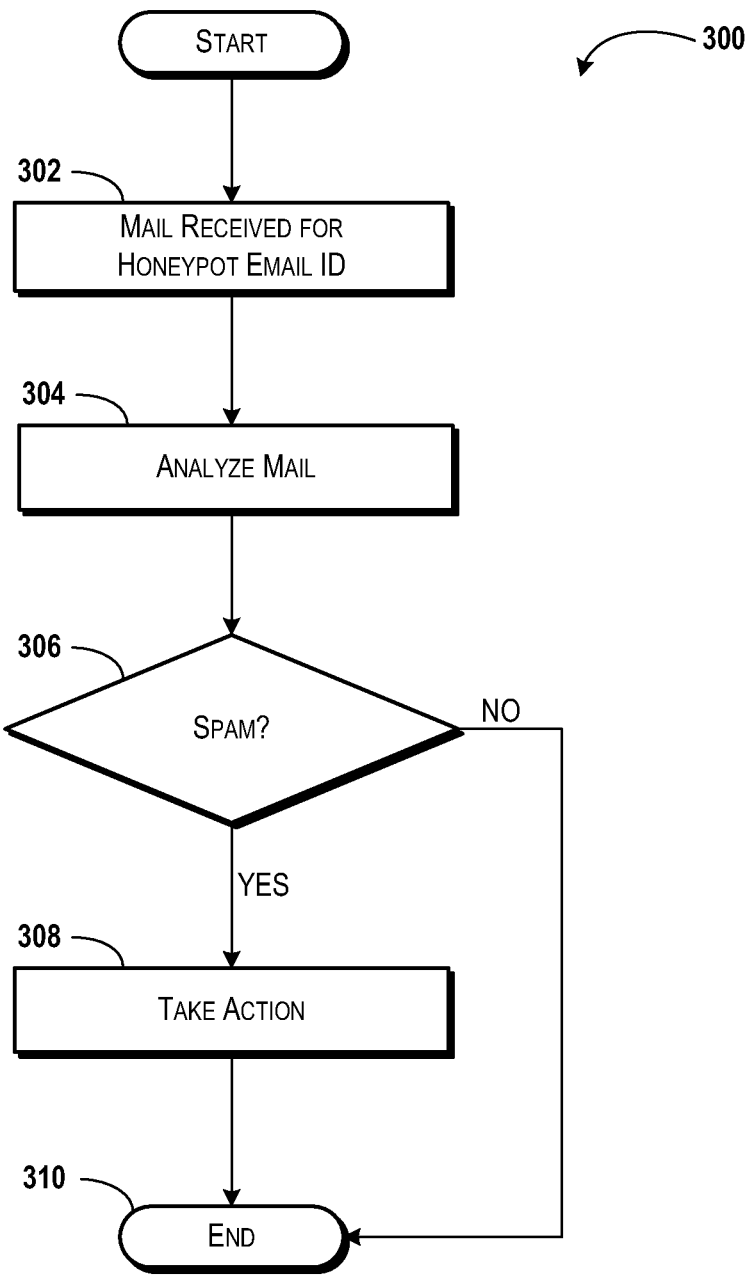
FIG. 3 is a flow diagram showing aspects of a method for mitigating email spam attacks, according to an exemplary embodiment.

Turning now to FIG. 3, aspects of a method 300 for mitigating email spam attacks will be described in detail, according to an exemplary embodiment. The method 300 begins at operation 302, wherein mail 108 addressed to the honeypot email ID is received. As explained above with reference to FIG. 2, the honeypot email ID can be created in response to receiving a number of messages intended for delivery to an invalid email address. It also should be understood that before the honeypot email ID was created, for example via the method 200 illustrated in FIG. 2, the address was an invalid address and status messages 118 indicating this may have been sent to the mail system 110 from which messages to the invalid address originated. Thus, in some embodiments, the gateway 102 suspects that messages directed to the honeypot email ID are spam messages. In embodiments, the gateway 102 is configured to mitigate spam attacks based upon analysis of additional messages addressed to the honeypot email ID.

From operation 302, the method 300 proceeds to operation 304, wherein the gateway 102 analyzes the mail 108. While spam and virus filters may be applied to all incoming mail 108 at the gateway 102, the operation 302 includes, in some embodiments, enhanced spam and/or virus analysis. The gateway 102 can analyze the mail 108 to determine the content of the mail 108, to examine links or images in the mail 108, if any, to examine IP addresses associated with the message, and/or other aspects of the mail 108 that can be used to determine if the mail 108 is spam.

From operation 304, the method 300 proceeds to operation 306, wherein the gateway 102 determines if the mail 108 is spam. The content of the mail 108 can be compared to known spam content, IP address can be compared to IP address blacklists, images can be analyzed to determine if the images correspond to advertisements, links can be examined for redirects, viruses, and/or advertising, and the like. Because spam filters are generally known and understood, the various methods used to analyze messages to identify spam content will not be described in additional detail herein.

If the gateway determines, in operation 306, that the mail 108 is spam, the method 300 proceeds to operation 308, wherein the gateway 102 takes an action with respect to the mail 108. In some embodiments, for example, the action includes identifying one or more sources of the mail 108, for example, one or more senders, IP addresses, ISPs, accounts, email addresses, and the like, and adding the source to a blacklist. The source also can be shared or sold to other ISPs to aid the other ISPs in thwarting spam attacks.

In other embodiments, the action includes creating a new quarantine/delete rule for messages associated with the source of the mail 108 and/or for messages containing content equivalent to the content of the mail 108. Thus, for example, mail 108 directed to any email address that has the same source of the mail 108 may be identified or suspected as spam and subjected to enhanced filtering and/or blocking rules. According to various embodiments of the concepts and technologies disclosed herein, the source of the mail 108 may be unaware that content sent to the honeypot email ID has been identified as spam, and may not attempt to resend the mail 108 and/or identify a new address to which to send the mail 108. Thus, a volume of mail 108 sent by or on behalf of a source of the mail 108 may not increase as a result of actions taken by the gateway 102.

Furthermore, it will be understood that the gateway 102 can create a number of honeypot email IDs over a period of time. From the perspective of senders of spam messages, it may appear that spam messages have been successfully delivered to the intended recipients, as the spam messages have not been bounced and/or have not prompted generation of the status messages 118. As such, the senders of the spam messages may not resend the mail 108 and/or define new addresses for the mail 108. In various implementations, the portion of spam messages sent to honeypot email IDs created by the gateway 102 grows over time. Because spammers may be unaware that spam messages have been delivered to honeypot email IDs, the spammers may not increase the overall volume of spam messages sent. Furthermore, in some embodiments, creation of the honeypot email IDs is used to mitigate the impact of spam attacks. In particular, in some embodiments, a large number of honeypot email IDs are created to the extent that the honeypot email IDs obfuscate legitimate email addresses.

Thus, embodiments of the concepts and technologies disclosed herein allow ISPs and/or other entities to mitigate spam attacks without necessarily taking direct action against senders of the spam messages. The spam messages delivered to the honeypot email IDs can be analyzed, immediately deleted, quarantined, and/or otherwise used, if desired. Furthermore, because the honeypot email IDs are not checked by users, the honeypot email IDs themselves can function as message quarantines. Thus, it will be appreciated that through creating honeypot email IDs, the gateway 102 can mitigate present or future spam attacks by taking action against a sender or creating a large number of honeypot email IDs to which the spam messages are successfully delivered.

From operation 308, the method 300 proceeds to operation 310. Additionally, if the gateway 102 determines, in operation 306, that the mail 108 is not spam, the method 300 proceeds to operation 310. The method 300 ends at operation 310.

Figure 4:
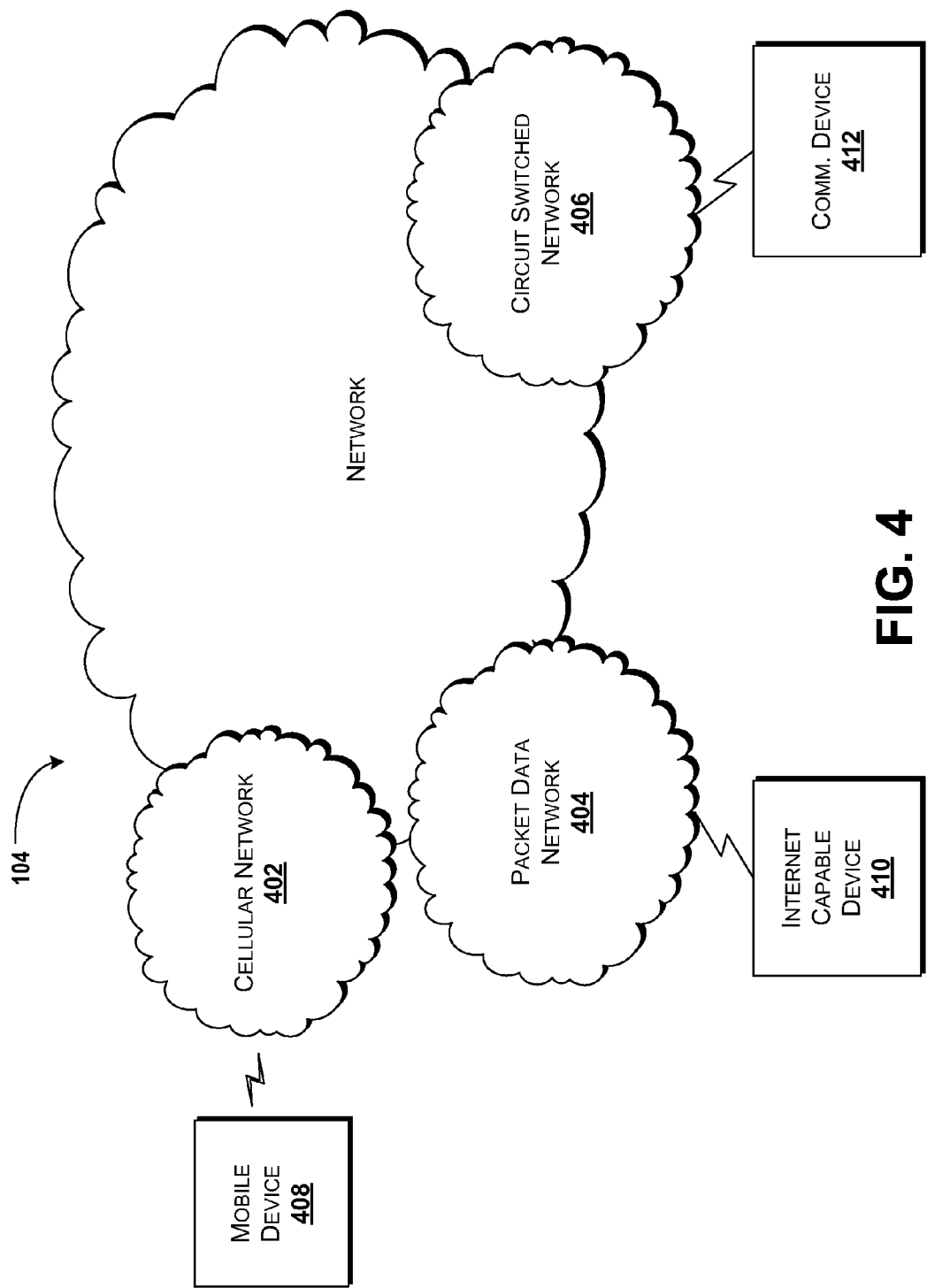
FIG. 4 schematically illustrates a network, according to an exemplary embodiment.

Turning now to FIG. 4, additional details of the network 104 are illustrated, according to an exemplary embodiment. The network 104 includes a cellular network 402, a packet data network 404, for example, the Internet, and a circuit switched network 406, for example, a publicly switched telephone network ("PSTN"). The cellular network 402 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 402 also includes radios and nodes for receiving and transmitting voice, data, and combinations thereof to and from radio transceivers, networks, the packet data network 404, and the circuit switched network 406.

A mobile communications device 408, such as, for example, a cellular telephone, a user equipment, a mobile terminal, a PDA, a laptop computer, a handheld computer, and combinations thereof, can be operatively connected to the cellular network 402. The cellular network 402 can be configured as a 2G GSM network and can provide data communications via GPRS and/or EDGE. Additionally, or alternatively, the cellular network 402 can be configured as a 3G UMTS network and can provide data communications via the HSPA protocol family, for example, HSDPA, EUL (also referred to as HSUPA), and HSPA+. The cellular network 402 also is compatible with 4G mobile communications standards as well as evolved and future mobile standards.

The packet data network 404 includes various devices, for example, servers, computers, databases, and other devices in communication with another, as is generally known. The packet data network 404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 404 includes or is in communication with the Internet. The circuit switched network 406 includes various hardware and software for providing circuit switched communications. The circuit switched network 406 may include, or may be, what is often referred to as a plain old telephone system (POTS). The functionality of a circuit switched network 406 or other circuit-switched network are generally known and will not be described herein in detail.

The illustrated cellular network 402 is shown in communication with the packet data network 404 and a circuit switched network 406, though it should be appreciated that this is not necessarily the case. One or more Internet-capable devices 410, for example, a PC, a laptop, a portable device, or another suitable device, can communicate with one or more cellular networks 402, and devices connected thereto, through the packet data network 404. It also should be appreciated that the Internet-capable device 410 can communicate with the packet data network 404 through the circuit switched network 406, the cellular network 402, and/or via other networks (not illustrated).

As illustrated, a communications device 412, for example, a telephone, facsimile machine, modem, computer, or the like, can be in communication with the circuit switched network 406, and therethrough to the packet data network 404 and/or the cellular network 402. It should be appreciated that the communications device 412 can be an Internet-capable device, and can be substantially similar to the Internet-capable device 410. In the specification, the network 104 is used to refer broadly to any combination of the networks 402, 404, 406. It should be appreciated that substantially all of the functionality described with reference to the network 104 can be performed by the cellular network 402, the packet data network 404, and/or the circuit switched network 406, alone or in combination with other networks, network elements, and the like.

Figure 5:
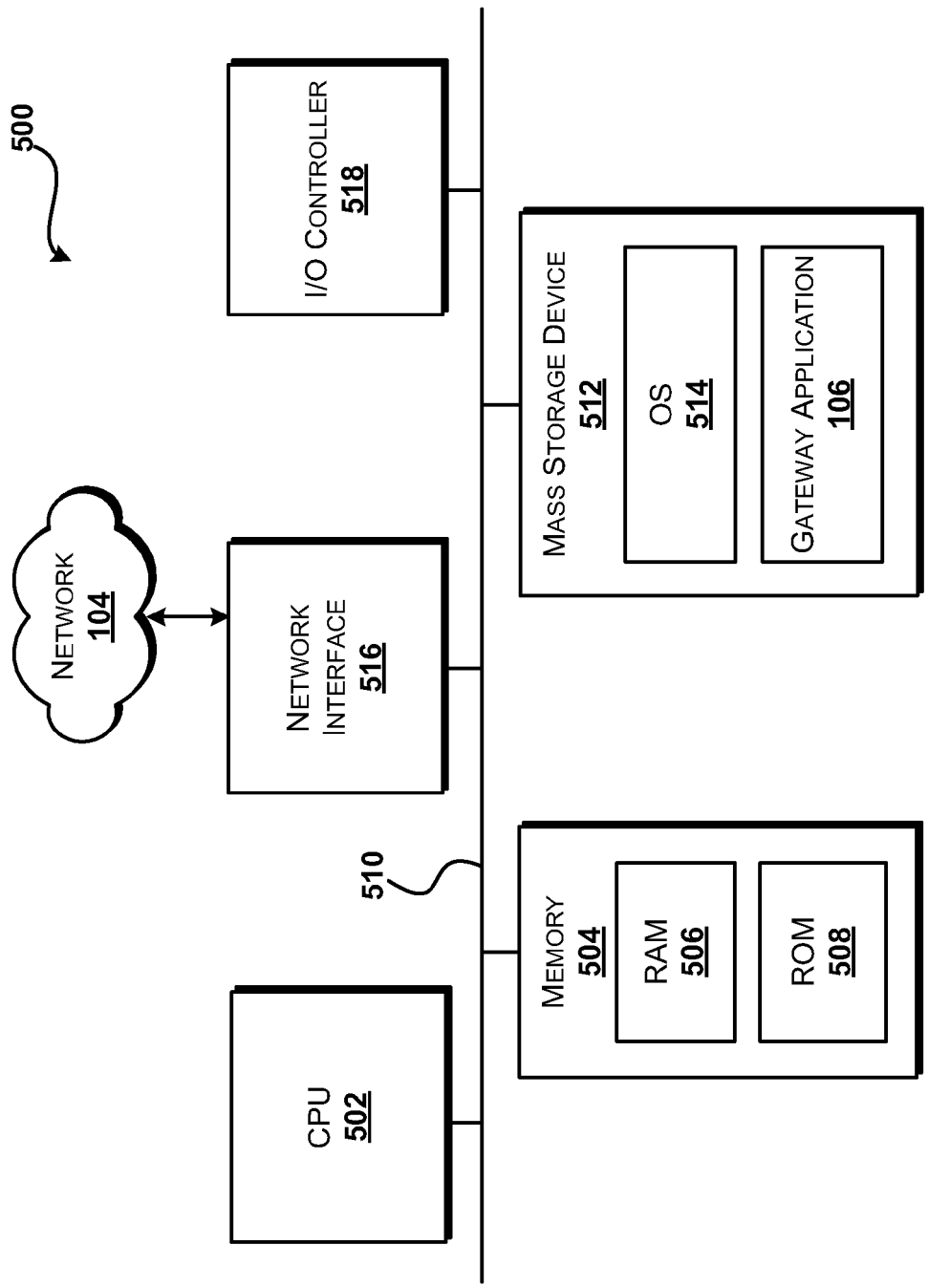
FIG. 5 is a computer architecture diagram illustrating an exemplary computer hardware and software architecture for a device capable of implementing aspects of the embodiments presented herein.

FIG. 5 illustrates an exemplary computer architecture 500 for a device capable of executing the software components described herein for mitigating email spam attacks. Thus, the computer architecture 500 illustrated in FIG. 5 illustrates an architecture for the gateway 102 or another device, which can be embodied in one or more server computers, routers, desktop computers, netbook computers, tablet computers, and/or laptop computers. According to some embodiments, a smart phone or mobile computing device can provide the functions of the gateway 102. In the illustrated embodiment, the computer architecture 500 illustrates a server computer that provides the functionality of gateway 102. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing an operating system 514 and the gateway application 106. Although not illustrated, the mass storage device 512 also can be configured to store the user data 112, the configuration files 116, and/or other data and/or computer-executable instructions.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. In the claims, the phrase "computer storage medium" and variations thereof, does not include waves, signals, and/or other transitory and/or intangible communication media, per se.

According to various embodiments, the computer architecture 500 may operate in a networked environment using logical connections to remote computers through a network such as the network 104. The computer architecture 500 may connect to the network 104 through a network interface 516 connected to the bus 510. The network interface 516 may be utilized to connect to other types of networks and remote computer systems, for example, the data storage device 114 and the mail system 110. The computer architecture 500 also may include an input/output controller 518 for receiving and processing input from a number of other devices, including a keyboard, mouse, touchscreen, or electronic stylus (not shown in FIG. 5). Similarly, the input/output controller 518 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Based on the foregoing, it should be appreciated that systems and methods for dynamically allocating multitier applications based upon performance and reliability of resources have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

I claim:

1. A method comprising:
   receiving, at a gateway comprising a processor and from a mail system, an email message;
   determining, by the gateway and based upon an analysis of the email message, destination addresses associated with the email message, wherein the destination addresses include a recipient email address;
   accessing, by the gateway, user data that comprises a list of email addresses associated with an internet service provider, wherein the list of email addresses comprises valid email addresses, expired email addresses, and invalid email addresses;
   querying, by the gateway, the user data to determine if the recipient email address is valid; and
   in response to a determination that the recipient email address is invalid
      determining, by the gateway and based upon a configuration file, a number of times delivery of email messages to the recipient email address has been attempted,
      determining, by the gateway, if the number of times meets a delivery attempt threshold associated with the recipient email address, the delivery attempt threshold comprising a number of message delivery attempts within a specified time period,
      in response to a determination that the number of times meets the delivery attempt threshold, requesting, by the gateway, creation of a honeypot email address comprising the recipient email address,
      receiving, by the gateway, a further email message that is addressed to the recipient email address, and
      delivering, by the gateway, the further email message to a mailbox associated with the honeypot email address, whereby a sender of the further email message is not informed that the recipient email address is invalid.

2. The method of claim 1, further comprising storing data identifying the honeypot email address at a data storage location accessible by the gateway.

3. The method of claim 1, further comprising:
analyzing the further email message delivered to the mailbox associated with the honeypot email address to determine content of the further email message; and
determining that the further email message comprises a spam message based upon the content determined.

4. The method of claim 1, further comprising:
analyzing the further email message delivered to the mailbox associated with the honeypot email address; and
updating a spam filter to include data identifying the sender of the further email message.

5. The method of claim 1, further comprising:
analyzing the further email message delivered to the mailbox associated with the honeypot email address to determine content of the further email message; and
updating a spam filter to include data corresponding to the content.

6. The method of claim 3, wherein the honeypot email address comprises a domain name associated with the internet service provider, and wherein an email address of the sender comprises the domain name.

7. The method of claim 1, further comprising:
scanning the mailbox associated with the honeypot email address;
counting a number of email messages deposited in the mailbox;
determining, based partially upon the number of email messages, a filtration rate for spam messages.

8. The method of claim 7, wherein the filtration rate is used to measure effectiveness of spam filtration.

9. A computer storage medium having computer-executable instructions stored thereon that, when executed by a processor, cause the processor to perform operations comprising:
receiving, from a mail system, an email message;
determining, based upon an analysis of the email message, destination addresses associated with the email message, wherein the destination addresses include a recipient email address;
accessing user data that comprises a list of email addresses associated with an internet service provider, wherein the list of email addresses comprises valid email addresses, expired email addresses, and invalid email addresses;
querying the user data to determine if the recipient email address is valid;
in response to a determination that the recipient email address is invalid
determining, based upon a configuration file, a number of times delivery of email messages to the recipient email address has been attempted,
determining if the number of times meets a delivery attempt threshold associated with the recipient email address, the delivery attempt threshold comprising a number of message delivery attempts within a specified time period,
in response to a determination that the number of times meets the delivery attempt threshold, requesting creation of a honeypot email address comprising the recipient email address;
receiving a further email message that is addressed to the recipient email address; and
delivering the further email message to a mailbox associated with the honeypot email address, whereby a sender of the further email message is not informed that the recipient email address is invalid.

10. The computer storage medium of claim 9, wherein the computer-executable instructions, when executed by the processor, cause the processor to perform operations comprising:
analyzing the further email message delivered to the mailbox associated with the honeypot email address to identify content of the further email message; and
determining that the further email message comprises a spam message based upon the content identified.

11. The computer storage medium of claim 9, wherein the computer-executable instructions, when executed by the processor, cause the processor to perform operations further comprising:
scanning the mailbox associated with the honeypot email address;
counting a number of email messages deposited in the mailbox;
determining, based partially upon the number of email messages, a filtration rate for spam messages.

12. The computer storage medium of claim 11, wherein the filtration rate is used to measure effectiveness of spam filtration.

13. A system comprising:
a processor; and
a memory that stores computer-executable instructions that, when executed by the processor, cause the processor to perform operations comprising
receiving, from a mail system, an email message,
determining, based upon an analysis of the email message, destination addresses associated with the email message, wherein the destination addresses include a recipient email address,
accessing user data that comprises a list of email addresses associated with an internet service provider, wherein the list of email addresses comprises valid email addresses, expired email addresses, and invalid email addresses,
querying the user data to determine if the recipient email address is valid,
in response to a determination that the recipient email address is invalid
determining, based upon a configuration file, a number of times delivery of email messages to the recipient email address has been attempted,
determining if the number of times meets a delivery attempt threshold associated with the recipient email address, the delivery attempt threshold comprising a number of message delivery attempts within a specified time period,
in response to a determination that the number of times meets the delivery attempt threshold, requesting creation of a honeypot email address comprising the recipient email address,
receiving a further email message that is addressed to the recipient email address, and
delivering the further email message to a mailbox associated with the honeypot email address, whereby a sender of the further email message is not informed that the recipient email address is invalid.

14. The system of claim 13, wherein the computer-executable instructions, when executed by the processor, cause the processor to perform operations further comprising:
analyzing the further email message delivered to the mailbox associated with the honeypot email address to identify content of the further email message; and determining that the further email message comprises a spam message based upon the content identified.

15. The system of claim 13, wherein the computer-executable instructions, when executed by the processor, cause the processor to perform operations further comprising:
scanning the mailbox associated with the honeypot email address;
counting a number of email messages deposited in the mailbox;
determining, based partially upon the number of email messages, a filtration rate for spam messages.

16. The system of claim 15, wherein the filtration rate is used to measure effectiveness of spam filtration.

* * * * *